United States Patent
Mehl

(10) Patent No.: US 10,493,682 B2
(45) Date of Patent: *Dec. 3, 2019

(54) METHOD FOR MOLDING A POLYMER COMPOSITION

(71) Applicant: Milliken & Company, Spartanburg, SC (US)

(72) Inventor: Nathan A. Mehl, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 139 days.

This patent is subject to a terminal disclaimer.

(21) Appl. No.: 15/382,147

(22) Filed: Dec. 16, 2016

(65) Prior Publication Data

US 2017/0190092 A1 Jul. 6, 2017

Related U.S. Application Data

(60) Provisional application No. 62/274,092, filed on Dec. 31, 2015.

(51) Int. Cl.

| | | |
|---|---|---|
| *B29C 49/00* | (2006.01) | |
| *B29B 11/10* | (2006.01) | |
| *B29C 49/70* | (2006.01) | |
| *C08K 5/053* | (2006.01) | |
| *C08K 5/06* | (2006.01) | |
| *B29C 48/92* | (2019.01) | |
| *B29C 49/04* | (2006.01) | |
| *B29K 23/00* | (2006.01) | |
| *B29L 31/00* | (2006.01) | |
| *B29C 48/09* | (2019.01) | |
| *B29C 48/00* | (2019.01) | |

(52) U.S. Cl.
CPC .......... *B29C 49/0005* (2013.01); *B29B 11/10* (2013.01); *B29C 48/92* (2019.02); *B29C 49/70* (2013.01); *C08K 5/053* (2013.01); *C08K 5/06* (2013.01); *B29C 48/0017* (2019.02); *B29C 48/09* (2019.02); *B29C 49/04* (2013.01); *B29C 2948/92704* (2019.02); *B29K 2023/12* (2013.01); *B29K 2065/00* (2013.01); *B29K 2995/0018* (2013.01); *B29L 2031/7158* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 4,371,645 A | 2/1983 | Mahaffey, Jr. | |
| 4,611,024 A | 9/1986 | Wolfe | |
| 5,049,605 A | 9/1991 | Rekers | |
| 5,731,474 A | 3/1998 | Scrivens et al. | |
| 6,582,503 B2 | 1/2003 | Dotson et al. | |
| 7,157,510 B2 | 1/2007 | Xie et al. | |
| 7,262,236 B2 | 8/2007 | Xie et al. | |
| 8,022,133 B2 | 9/2011 | Xu et al. | |
| 9,926,433 B2 * | 3/2018 | Mehl | C08K 5/1575 |
| 2002/0188044 A1 | 12/2002 | Dotson et al. | |
| 2003/0008953 A1 | 1/2003 | Dotson et al. | |
| 2006/0173108 A1 | 8/2006 | Xu et al. | |
| 2013/0289176 A1 | 10/2013 | Li et al. | |
| 2013/0296580 A1 | 11/2013 | Uppara et al. | |

FOREIGN PATENT DOCUMENTS

| | | |
|---|---|---|
| EP | 0 524 404 A1 | 1/1993 |
| EP | 0 953 598 A1 | 11/1999 |
| EP | 2 350 187 A1 | 8/2011 |
| WO | WO 2000/069967 A1 | 11/2000 |
| WO | WO 02/20528 A2 | 3/2002 |
| WO | WO 2016/109708 A1 | 7/2016 |

OTHER PUBLICATIONS

PCT/US2016/067309 International Search Report, filed Dec. 16, 2016, 6 pages.
PCT/US2016/067309 Written Opinion of the International Searching Authority, filed Dec. 16, 2016, 6 pages.

* cited by examiner

*Primary Examiner* — Monica A Huson
(74) *Attorney, Agent, or Firm* — Robert M. Lanning

(57) ABSTRACT

A method for molding a polymer composition comprises the steps of (a) providing an apparatus comprising a die and a mold cavity, (b) providing a polymer composition, (c) heating the polymer composition to a temperature sufficient to melt the polymer composition, (d) extruding the molten polymer composition through the die to form a parison, (e) capturing the parison in the mold cavity, (f) blowing a pressurized fluid into the parison, (g) allowing the molded article to cool, and (h) removing the molded article from the mold cavity.

7 Claims, No Drawings

US 10,493,682 B2

METHOD FOR MOLDING A POLYMER COMPOSITION

CROSS REFERENCE TO RELATED APPLICATIONS

This application claims, pursuant to 35 U.S.C. §119(e)(1), priority to and the benefit of the filing date of U.S. Patent Application No. 62/274,092 filed on Dec. 31, 2016, which application is hereby incorporated by reference in its entirety.

TECHNICAL FIELD OF THE INVENTION

This application generally relates to methods for molding polymer compositions. More specifically, the application relates to methods for molding polymer compositions to produce molded articles exhibiting desirable aesthetics, such as low levels of haze.

BRIEF SUMMARY OF THE INVENTION

The invention generally provides a method for molding a polymer composition, such as a method for extrusion blow molding a polymer composition to produce a molded article. The method uses lower temperatures, which results in energy savings, and yet still produces molded articles exhibiting desirably low levels of haze.

In a first embodiment, the invention provides a method for molding a polymer composition, the method comprising the steps of:

(a) providing an apparatus comprising a die and a mold cavity, the mold cavity having an interior surface defining a shape for a molded article;

(b) providing a polymer composition comprising (i) a thermoplastic polymer and (ii) 1,3:2,4-bis-O-[(3,4-dichlorophenyl)methylene]-D-glucitol;

(c) heating the polymer composition to a temperature sufficient to melt the polymer composition so that it may be extruded through the die;

(d) extruding the molten polymer composition through the die to form a parison at a temperature of 200° C. or less;

(e) capturing the parison in the mold cavity;

(f) blowing a pressurized fluid into the parison under sufficient pressure to inflate the parison so that it conforms to the interior surface of the mold cavity and produces a molded article;

(g) allowing the molded article to cool to a temperature at which the polymer composition at least partially solidifies so that the molded article retains its shape; and (h) removing the molded article from the mold cavity.

DETAILED DESCRIPTION OF THE INVENTION

In a first embodiment, the invention provides a method for molding a polymer composition. The method generally comprises the steps of (a) providing an apparatus comprising a die and a mold cavity, (b) providing a polymer composition, (c) heating the polymer composition to a temperature sufficient to melt the polymer composition, (d) extruding the molten polymer composition through the die to form a parison, (e) capturing the parison in the mold cavity, (f) blowing a pressurized fluid into the parison, (g) allowing the molded article to cool, and (h) removing the molded article from the mold cavity.

The apparatus used in practicing the method of the invention can be any suitable extrusion blow molding apparatus. Suitable extrusion blow molding apparatus include continuous extrusion blow molding apparatus, such as rotary wheel extrusion blow molding apparatus and shuttle extrusion blow molding apparatus, and intermittent extrusion blow molding apparatus, such as reciprocating screw extrusion blow molding apparatus and accumulator head extrusion blow molding apparatus. As noted above, the apparatus includes a die through which the plasticized (molten) polymer composition is extruded to form a parison. The apparatus also includes a mold having a mold cavity. The mold cavity or the interior surfaces of the mold cavity defines the shape of the molded article to be produced by the apparatus. More specifically, the interior surfaces of the mold cavity define the exterior surfaces of the molded article produced by the apparatus.

As will be understood by those of ordinary skill in the art, the step of heating the polymer composition to a temperature sufficient to plasticize (melt) the composition typically is achieved, at least in part, by the friction generated by the extruder screw used to feed the polymer composition to the die of the apparatus. This frictional heating typically is supplemented using heaters, which allows the polymer composition to be heated under more controlled conditions and to a temperature at which the polymer composition is more easily extruded through the die.

Once the polymer composition has been heated to the temperature, the polymer composition is extruded through the die of the apparatus to form a parison. In the present invention, the polymer composition is extruded through the die to form a parison at a temperature of 200° C. or less. The resulting parison is then captured in the mold cavity of the apparatus. The mold typically contains a single opening that allows access to the mold cavity. The parison is captured in the mold in such a way that the open end of the parison is aligned with the opening in the mold. Once the parison has been captured in the mold, a pressurized fluid (e.g., air) is blown into the parison under sufficient pressure to inflate the parison so that it conforms to the interior surface of the mold cavity and forms the desired molded article. Once the parison has been blown to form the desired molded article, the article is held in the mold for an amount of time sufficient for the polymer to solidify to such a degree that the article maintains its shape when removed from the mold. The mold of the apparatus typically is cooled so that this cooling can be more rapidly achieved and the cycle time lowered.

The polymer composition used in the described method comprises a thermoplastic polymer and 1,3:2,4-bis-O-[(3,4-dichlorophenyl)methylene]-D-glucitol. In a preferred embodiment, the polymer composition comprises a polyolefin polymer. The polyolefin polymer can be any suitable polyolefin, such as a polypropylene, a polyethylene, a polybutylene, a poly(4-methyl-1-pentene), and a poly(vinyl cyclohexane). In a preferred embodiment, the thermoplastic polymer is a polyolefin selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %. The polyolefin polymers described above can be branched or cross-linked, such as the branching or cross-linking that results from the addition of additives that increase the melt strength of the polymer.

As noted above, the polymer composition comprises 1,3:2,4-bis-O-[(3,4-dichlorophenyl)methylene]-D-glucitol. This compound is an acetal that can be produced by the reaction of an alditol with a substituted benzenecarbaldehyde compound. More specifically, the compound can be produced by the reaction of approximately 1 mole of D-glucitol with approximately 2 moles of 3,4-dichlorobenzenecarbaldehyde. The 1,3:2,4-bis-O-[(3,4-dichlorophenyl)methylene]-D-glucitol can be provided in any suitable physical form, but generally the compound is provided in the form of a powder.

As noted above, the 1,3:2,4-bis-O-[(3,4-dichlorophenyl)methylene]-D-glucitol typically is provided in the form of a powder, which powder contains many fine particles. The particles present in the powder generally are grouped into three different particle types of increasing size and complexity: primary particles; aggregates; and agglomerates. The primary particles generally are single crystals of the compound or fragments of such single crystals. The aggregates are comprised of two or more primary particles that have become strongly bound to each other. The aggregates cannot be reduced in size (e.g., reduced to their constituent primary particles) except through milling. The agglomerates are comprised of several primary particles and/or aggregates that have become weakly associated or bound together. The agglomerates can be reduced in size (e.g., broken apart and reduced to their constituent primary particles and/or aggregates) by the application of relatively modest mechanical forces. For example, the agglomerates can be reduced in size upon dispersion in a suitable liquid medium. The agglomerates typically contain relatively large voids within their interior dimensions, and these voids are filled with air. When such agglomerates are dispersed in the molten polymer during processing, the agglomerates break apart as the compound dissolves in the molten polymer. The air trapped in the voids can then become entrained in the molten polymer, and this entrained air leads to the formation of defects (e.g., white specks and/or bubbles) in the polymer composition.

The powder can have any suitable particle size. However, in order to facilitate dissolution of the compounds in the molten polymer and prevent the formation of defects (e.g., white specks or bubbles) in the polymer composition, Applicants believe that it is advantageous for the particles to have a relatively small particle size. In a preferred embodiment, the volume mean diameter (i.e., the D[4,3]) of the 1,3:2,4-bis-O-[(3,4-dichlorophenyl)methylene]-D-glucitol particles is about 40 μm or less, about 35 μm or less, about 30 μm or less, or about 25 μm or less. Further, the $D_{90}$ of the 1,3:2,4-bis-O-[(3,4-dichlorophenyl)methylene]-D-glucitol particles preferably is about 80 μm or less, about 75 μm or less, about 70 μm or less, about 65 μm or less, about 60 μm or less, or about 55 μm or less.

The particle size of the 1,3:2,4-bis-O-[(3,4-dichlorophenyl)methylene]-D-glucitol can be measured using any suitable technique. For example, the particle size of the powder can be measured via dynamic light scattering using one of the many commercially available instruments designed for such measurements. When a dynamic light scattering technique is used, a representative sample of the particles generally is dispersed in a liquid medium and a sample of this liquid medium is introduced into the dynamic light scattering instrument. Any suitable liquid medium can be used, but water generally is the preferred medium. In order to facilitate dispersion of the particles in the liquid medium, a surfactant, preferably a non-ionic surfactant (e.g., an octylphenol surfactant), can be added to the water and the resulting mixture (i.e., water, surfactant, and particles) can be stirred for a sufficient time for the particles to disperse (e.g., for 1-5 minutes).

The 1,3:2,4-bis-O-[(3,4-dichlorophenyl)methylene]-D-glucitol can be present in the polymer composition in any suitable absolute amount. Typically, the amount of 1,3:2,4-bis-O-[(3,4-dichlorophenyl)methylene]-D-glucitol present in the polymer composition is about 250 parts-per-million (ppm) or more based on the weight of the polymer (e.g., polypropylene polymer) present in the polymer composition. Preferably, the amount of 1,3:2,4-bis-O-[(3,4-dichlorophenyl)methylene]-D-glucitol present in the polymer composition is about 500 ppm or more, about 750 ppm or more, about 1,000 ppm or more, about 1,250 ppm or more, or about 1,500 ppm or more based on the weight of the polymer (e.g., polypropylene polymer) present in the polymer composition. The amount of 1,3:2,4-bis-O-[(3,4-dichlorophenyl)methylene]-D-glucitol present in the polymer composition typically is also about 4,000 ppm or less based on the weight of the polymer (e.g., polypropylene polymer) present in the polymer composition. Preferably, the amount of 1,3:2,4-bis-O-[(3,4-dichlorophenyl)methylene]-D-glucitol present in the polymer composition is about 3,500 ppm or less, about 3,000 ppm or less, about 2,750 ppm or less, about 2,500 ppm or less, about 2,250 ppm or less, or about 2,500 ppm or less based on the weight of the polymer (e.g., polypropylene polymer) present in the polymer composition. Thus, in a series of sequentially more preferred embodiments, the amount of 1,3:2,4-bis-O-[(3,4-dichlorophenyl)methylene]-D-glucitol present in the polymer composition is about 250 ppm to about 4,000 ppm, about 250 ppm to about 3,000 ppm, about 250 ppm to about 2,500 ppm, or about 500 ppm to about 2,000 ppm based on the weight of the polymer (e.g., polypropylene polymer) present in the polymer composition.

In certain possibly preferred embodiments, the polymer composition can comprise another acetal compound in addition to the 1,3:2,4-bis-O-[(3,4-dichlorophenyl)methylene]-D-glucitol. In a particularly preferred embodiment, the polymer composition additionally comprises 1,3:2,4-bis-O-[(3,4-dimethylphenyl)methylene]-D-glucitol. The 1,3:2,4-bis-O-[(3,4-dimethylphenyl)methylene]-D-glucitol can be produced by the reaction of approximately 1 mole of D-glucitol with approximately 2 moles of o-xylenecarbaldehyde. The 1,3:2,4-bis-O-[(3,4-dimethylphenyl)methylene]-D-glucitol can be provided in any suitable physical form, but, as with the 1,3:2,4-bis-O-[(3,4-dichlorophenyl)methylene]-D-glucitol, the compound generally is provided in the form of a powder containing may fine particles.

The particle size of the 1,3:2,4-bis-O-[(3,4-dimethylphenyl)methylene]-D-glucitol can be the same (e.g., in terms of volume mean diameter, $D_{90}$, or both) as the particle size of the 1,3:2,4-bis-O-[(3,4-dichlorophenyl)methylene]-D-glucitol described above. Alternatively, the particle size of the 1,3:2,4-bis-O-[(3,4-dimethylphenyl)methylene]-D-glucitol can be smaller (e.g., in terms of volume mean diameter, $D_{90}$, or both) than the particle size of the 1,3:2,4-bis-O-[(3,4-dichlorophenyl)methylene]-D-glucitol. In a preferred embodiment, the volume mean diameter (i.e., the D[4,3]) of the 1,3:2,4-bis-O-[(3,4-dimethylphenyl)methylene]-D-glucitol particles is about 40 µm or less, about 35 µm or less, about 30 µm or less, about 25 µm or less, about 20 µm or less, about 15 µm or less, about 10 µm or less, or about 7.5 µm or less. Further, the $D_{90}$ of the 1,3:2,4-bis-O-[(3,4-dimethylphenyl)methylene]-D-glucitol particles preferably is about 80 µm or less, about 75 µm or less, about 70 µm or less, about 65 µm or less, about 60 µm or less, about 55 µm or less, about 50 µm or less, about 45 µm or less, about 40 µm or less, about 35 µm or less, about 30 µm or less, about 25 µm or less, about 20 µm or less, about 15 µm or less, about 10 µm or less, or about 7.5 µm or less.

When present in the polymer composition, the 1,3:2,4-bis-O-[(3,4-dimethylphenyl)methylene]-D-glucitol can be present in any suitable amount. For example, the 1,3:2,4-bis-O-[(3,4-dimethylphenyl)methylene]-D-glucitol can be present in any of the amounts listed above for the 1,3:2,4-bis-O-[(3,4-dichlorophenyl)methylene]-D-glucitol. Alternatively, the combined amount of 1,3:2,4-bis-O-[(3,4-dichlorophenyl)methylene]-D-glucitol and 1,3:2,4-bis-O-[(3,4-dimethylphenyl)methylene]-D-glucitol present in the polymer composition can fall within any of the ranges described above for the 1,3:2,4-bis-O-[(3,4-dichlorophenyl)methylene]-D-glucitol.

When the polymer composition comprises both 1,3:2,4-bis-O-[(3,4-dichlorophenyl)methylene]-D-glucitol and 1,3:2,4-bis-O-[(3,4-dimethylphenyl)methylene]-D-glucitol, the two compounds can be present in the polymer composition in any suitable relative amounts. For example, the ratio of the mass of 1,3:2,4-bis-O-[(3,4-dimethylphenyl)methylene]-D-glucitol present in the polymer composition to the mass of 1,3:2,4-bis-O-[(3,4-dichlorophenyl)methylene]-D-glucitol present in the polymer composition preferably can be about 9:1 or less, about 8:1 or less, about 7:1 or less, about 6:1 or less, about 5:1 or less, about 4:1 or less, or about 3:1 or less. The ratio of the mass of 1,3:2,4-bis-O-[(3,4-dimethylphenyl)methylene]-D-glucitol present in the polymer composition to the mass of 1,3:2,4-bis-O-[(3,4-dichlorophenyl)methylene]-D-glucitol present in the polymer composition preferably can be about 1:9 or more, about 1:8 or more, about 1:7 or more, about 1:6 or more, about 1:5 or more, about 1:4 or more, or about 1:3 or more. In one preferred embodiment, the ratio of the mass of 1,3:2,4-bis-O-[(3,4-dimethylphenyl)methylene]-D-glucitol present in the polymer composition to the mass of 1,3:2,4-bis-O-[(3,4-dichlorophenyl)methylene]-D-glucitol present in the polymer composition is about 9:1 to about 1:9. In a series of sequentially more preferred embodiments, the ratio of the mass of 1,3:2,4-bis-O-[(3,4-dimethylphenyl)methylene]-D-glucitol present in the polymer composition to the mass of 1,3:2,4-bis-O-[(3,4-dichlorophenyl)methylene]-D-glucitol present in the polymer composition is about 8:1 to about 1:8, about 7:1 to about 1:7, about 6:1 to about 1:6, about 5:1 to about 1:5, about 4:1 to about 1:4, or about 3:1 to about 1:3.

In certain possibly preferred embodiments, the polymer composition can comprise a fluoropolymer in addition to the polymer and the 1,3:2,4-bis-O-[(3,4-dichlorophenyl)methylene]-D-glucitol. The fluoropolymer present in such a polymer composition can be any suitable fluoropolymer (e.g., fluoroplastic or fluoroelastomer). Suitable fluoropolymers include, but are not limited to, polymers made from at least one monomer selected from the group consisting of vinylidene fluoride, hexafluoropropylene, chlorotrifluoroethylene, tetrafluoroethylene, perfluoro(alkyl vinyl ether), and combinations thereof. In certain possibly preferred embodiments, the fluoropolymer is a polymer selected from the group consisting of (i) copolymers of vinylidene fluoride and a comonomer selected from the group consisting of hexafluoropropylene, chlorotrifluoroethylene, 1-hydropentafluoropropylene, and 2-hydropentafluoropropylene; (ii) terpolymers of vinylidene fluoride, tetrafluoroethylene, and a comonomer selected from the group consisting hexafluoropropylene, 1-hydropentafluoropropylene, and 2-hydropentafluoropropylene; (iii) copolymers of tetrafluoroethylene and propylene; (iv) copolymers of tetrafluoroethylene, propylene, and vinylidene fluoride; and (v) combinations of two or more of (i)-(iv). In certain more specific possibly preferred embodiments, the fluoropolymer is a terpolymer of vinylidene fluoride, tetrafluoroethylene, and hexafluoropropylene.

The fluoropolymers suitable for use in the polymer composition can have any suitable molecular weight. However, in certain possibly preferred embodiments, the fluoropolymer has a relatively high molecular weight. While not wishing to be bound to any particular theory, it is believed that fluoropolymers having a relatively high molecular weight are particularly well-suited for use in the polymer composition of the invention due, at least in part, to the ability of such fluoropolymers to form and maintain coatings on the working surfaces of the equipment used to process the polymer composition. It is further believed that the coating formed on these working surfaces helps to improve the appearance of a molded article made from the polymer composition (e.g., improve the gloss) by preventing imperfections in these working surfaces from creating imperfections in the surfaces of the molded article or at least reducing the extent of the imperfections formed in the molded article.

As will be understood by those of ordinary skill in the art, the molecular weight of a polymer, including a fluoropolymer such as that used in the polymer composition of the invention, can be measured and expressed in many different ways, though measurements based on correlations between average molecular weight and one or more physical properties of the polymer are commonly used due to the complexity of measuring the molecular weight of the polymer chains in the polymer system. One such measurement is based on the correlation between average molecular weight and the rate of flow of the molten polymer (e.g., melt flow index (MFI)). Another such measurement is based on the correlation between average molecular weight and the shearing torque resisting rotation of a cylindrical metal disk or rotor embedded in the polymer (i.e., Mooney viscosity).

The fluoropolymers suitable for use in the polymer composition can have any suitable melt flow index (MFI). In certain possibly preferred embodiments, the fluoropolymer has an MFI of about 2 g/10 minutes or more, about 3 g/10 minutes or more, about 4 g/10 minutes or more, or about 5 g/10 minutes or more as measured in accordance with ASTM D1238-04c at 265° C. using a 5 kg weight. In certain possibly preferred embodiments, the fluoropolymer has an MFI of from about 2 to about 50 g/10 minutes, or about 3 to about 40 g/10 minutes, or about 4 to about 30 g/10 minutes as measured in accordance with ASTM D1238-04c at 265° C. using a 5 kg weight. In certain possibly more preferred embodiments, the fluoropolymer has an MFI of from about 5 to about 25 g/10 minutes as measured in accordance with ASTM D1238-04c at 265° C. using a 5 kg weight.

The fluoropolymers suitable for use in the polymer composition can have any suitable Mooney viscosity. In certain possibly preferred embodiments, the Mooney viscosity of the fluoropolymer is about 25 or more or about 28 or more, as measured in accordance with ASTM Standard D1646-07 at 121° C., large rotor, condition ML 1+10 minutes. In certain possibly preferred embodiments, the Mooney viscosity of the fluoropolymer is about 80 or less, about 70 or less, about 60 or less, about 50 or less, or about 40 or less (e.g., about 38 or less), as measured in accordance with ASTM Standard D1646-07 at 121° C., large rotor, condition ML 1+10 minutes. Thus, in certain possibly preferred embodiments, the Mooney viscosity of the fluoropolymer is about 25 to about 80, about 25 to about 70, about 25 to about 60, about 25 to about 50, or about 25 to about 40 (e.g., about 28 to about 38), as measured in accordance with ASTM Standard D1646-07 at 121° C., large rotor, condition ML 1+10 minutes.

The fluoropolymers suitable for use in the polymer composition include multimodal fluoropolymers. As utilized herein, the term "multimodal" is used to refer to a fluoropolymer that has at least two components of discrete and different molecular weights (e.g., discrete and different average molecular weights). Suitable multimodal fluoropolymer are described, for example, in International Patent Application Publication No. WO 2000/69967. In such multimodal fluoropolymers, each of the components may be amorphous or semi-crystalline, or one component may be amorphous and another component semi-crystalline.

The fluoropolymer can be present in the polymer composition in any suitable amount. In order to avoid or reduce deleterious effects on the optical properties of articles produced using the polymer composition, the applicant has found that the fluoropolymer typically should be present in the polymer composition in an amount that is relatively low. In certain possibly preferred embodiments, the fluoropolymer is present in the polymer composition in an amount of about 1,000 ppm or less, about 750 ppm or less, about 500 ppm or less, or about 250 ppm or less (e.g., about 200 ppm or less), based on the total weight of the polymer composition. In certain possibly preferred embodiments, the fluoropolymer can be present in the polymer composition in an amount such that the ratio of the amount of polymer additive present in the polymer composition to the amount of fluoropolymer present in the polymer composition is from about 4:1 to about 100:1, about 8:1 to about 100:1, about 10:1 to about 100:1, or about 20:1 to about 100:1, based on the total weight of the polymer additive and the fluoropolymer present in the polymer composition.

Many commercially-available fluoropolymers sold as polymer processing aids contain small amounts of at least one interfacial agent, such as a polyalkylene oxide (e.g., poly(ethylene glycol) or poly(ethylene oxide)), which is thought to improve the performance of the polymer processing aid by wetting the surface of the fluoropolymer particles in the polymer processing aid. However, despite the benefits typically associated with the use of interfacial agents, such as poly(ethylene glycol), it is believed that such interfacial agents can actually detract from the favorable optical properties of a molded article produced using a polymer composition of the invention. Accordingly, in certain possibly preferred embodiments, the polymer composition is substantially free of poly(ethylene glycol) or substantially free of any interfacial agent. More specifically, in certain possibly preferred embodiments, the polymer composition contains less than 100 ppm of poly(ethylene glycol), less than 50 ppm of poly(ethylene glycol), less than 25 ppm of poly(ethylene glycol), less than 10 ppm of poly(ethylene glycol), or less than 5 ppm of poly(ethylene glycol).

The polymer composition used in the method can contain an additional component selected from the group consisting of an ester composition, an amide compound, or mixtures thereof. The ester composition comprises at least one ester compound. The ester composition can comprise a plurality of different ester compounds. Preferably, at least a portion of the ester compounds present in the ester composition are an ester of 1,2,3-propanetriol and at least one fatty acid selected from the group consisting of $C_{14}$-$C_{22}$ fatty acids. The $C_{14}$-$C_{22}$ fatty acid can be selected from the group consisting of saturated fatty acids and unsaturated fatty acids, with saturated fatty acids being particularly preferred. In a preferred embodiment, at least a portion of the ester compounds present in the ester composition are an ester of 1,2,3-propanetriol and at least one fatty acid selected from the group consisting of $C_{16}$-$C_{18}$ fatty acids, with $C_{16}$-$C_{18}$ saturated fatty acids being particularly preferred. In another preferred embodiment, the ester composition comprises about 80% or more monoester compounds, more preferably about 85% or more monoester compounds, and most preferably about 90% or more monoester compounds. In a preferred embodiment, the ester composition comprises 2,3-dihydroxypropyl octadecanoate. More preferably, the ester composition comprises about 50% or more 2,3-dihydroxypropyl octadecanoate.

As noted above, the ester composition can comprise a plurality of different ester compounds. The presence of different ester compounds can be due, at least in part, to the distribution of different chain lengths in the fatty acid. For example, as is understood by those of ordinary skill in the art, a composition comprising a $C_{18}$ fatty acid can also contain appreciable amounts of a $C_{16}$ fatty acid. Thus, in the embodiment in which the ester composition comprises 2,3-dihydroxypropyl octadecanoate, the ester composition can also contain 2,3-dihydroxypropyl hexadecanoate. The amount of these related ester compounds present in the ester composition will depend, at least in part, on the particular source of fatty acid that is used. Naturally-derived sources of fatty acids can have relatively high amounts (e.g., up to 40% or more) of these related fatty acids.

When used, the ester composition can be present in the polymer composition in any suitable amount. Preferably, the ester composition is present in the polymer composition in an amount of about 50 ppm or more, more preferably about 100 ppm or more. In another preferred embodiment, the ester composition is present in the polymer composition in an amount of about 5,000 ppm or less, more preferably about 4,000 ppm or less, and most preferably about 3,000 ppm or less. Thus, in a particularly preferred embodiment, the ester composition is present in the polymer composition in an amount of about 50 ppm to about 5,000 ppm. In another particularly preferred embodiment, the ester composition is present in the polymer composition in an amount of about 100 ppm to about 3,000 ppm.

As noted above, the polymer composition can comprise an amide compound. The polymer composition can also comprises a plurality of different amide compounds. In a preferred embodiment, the polymer composition comprises an amide compound selected from the group consisting of compounds conforming to a structure of Formula (I) or Formula (X)

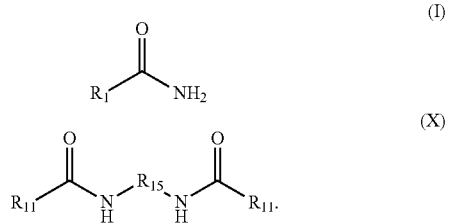

In the structure of Formula (I) and Formula (X), $R_1$ and $R_{11}$ are independently selected from the group consisting of $C_7$-$C_{27}$ alkyl groups and $C_7$-$C_{27}$ alkenyl groups, and $R_{15}$ is selected from the group consisting of $C_1$-$C_8$ alkanediyl groups. In a preferred embodiment, the polymer composition comprises an amide compound conforming to the structure of Formula (I) wherein $R_1$ is selected from the group consisting of $C_{17}$-$C_{21}$ alkenyl groups. More preferably, the polymer composition comprise an amide compound conforming to the structure of Formula (I) wherein $R_1$ is (Z)-12-heneicosen-1-yl. In another preferred embodiment, the polymer composition comprise an amide compound conforming to the structure of Formula (I) wherein $R_1$ is (Z)-8-heptadecen-1-yl. In another preferred embodiment, the polymer composition comprises an amide compound conforming to the structure of Formula (X) wherein $R_{11}$ is selected from the group consisting of $C_7$-$C_{27}$ alkyl groups, with $C_{15}$-$C_{21}$ alkyl groups being particularly preferred. In another preferred embodiment, the polymer composition comprises an amide compound conforming to the structure of Formula (X) wherein $R_{15}$ is selected from the group consisting of $C_1$-$C_3$ alkanediyl groups, with an ethane-1,2-diyl group being particularly preferred. Thus, in a particularly preferred embodiment, the polymer composition comprises an amide compound conforming to the structure of Formula (X) wherein each $R_{11}$ is heptadecan-1-yl and $R_{15}$ is ethane-1,2,-diyl.

As noted above, the polymer composition can comprise a mixture of different amide compounds. As with the ester compounds described above, the presence of these different amide compounds can be due, at least in part, to the distribution of different chain lengths in the fatty acid used in making the amide compound. Thus, a polymer composition comprising an amide compound conforming to the structure of Formula (I) wherein $R_1$ is (Z)-8-heptadecen-1-yl may also comprise an amide compound conforming to the structure of Formula (I) wherein $R_1$ is a $C_{15}$ alkenyl group. Further, the polymer composition can comprise a mixture of one or more amide compounds conforming to the structure of Formula (I) and one or more amide compounds conforming to the structure of Formula (X).

The amide compound can be present in the polymer composition in any suitable amount. Preferably, the amide compound is present in the polymer composition in an amount of about 50 ppm or more, more preferably about 100 ppm or more. In another preferred embodiment, the amide compound is present in the polymer composition in an amount of about 5,000 ppm or less, more preferably about 4,000 ppm or less, and most preferably about 3,000 ppm or less. Thus, in a particularly preferred embodiment, the amide compound is present in the polymer composition in an amount of about 50 ppm to about 5,000 ppm. In another particularly preferred embodiment, the amide compound is present in the polymer composition in an amount of about 100 ppm to about 3,000 ppm. When the polymer composition comprises more than one amide compound, each amide compound can be present in the polymer composition in an amount falling within the ranges described above, or the total amount of amide compounds present in the polymer composition can fall within the ranges described above. Preferably, the total amount of amide compounds present in the polymer composition falls within the ranges described above.

The polymer composition used in the method can contain other polymer additives in addition to the 1,3:2,4-bis-O-[(3,4-dichlorophenyl)methylene]-D-glucitol. Suitable additional polymer additives include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., metal salts of fatty acids, such as the metal salts of stearic acid), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

As noted above, the polymer composition can contain nucleating agents in addition to the other components described above. Suitable nucleating agents include, but are not limited to, 2,2'-methylene-bis-(4,6-di-tert-butylphenyl) phosphate salts (e.g., sodium 2,2'-methylene-bis-(4,6-di-tert-butylphenyl) phosphate or aluminum 2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate or calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, or strontium cyclohexane-1,2-dicarboxylate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

As noted above, the polymer composition can also contain one or more additional clarifying agents. Suitable clarifying agents include, but are not limited to, trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, amide derivatives of 1,3,5-benzenetriamine, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. As noted above, the clarifying agent can be an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the remaining positions on the aromatic ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively), with the di-acetal compounds being preferred. Suitable acetal-based clarifying agents include, but are not limited to, the clarifying agents disclosed in U.S. Pat. Nos. 5,049,605; 7,157,510; and 7,262,236.

The polymer composition used in the method can have any suitable apparent melt viscosity. The apparent melt viscosity of the polymer composition can be measured using any suitable method. For example, the apparent melt viscosity can be determining using the test method described in ASTM Test Method D3835-08 entitled "Standard Test Method for Determination of Properties of Polymeric Materials by Means of a Capillary Rheometer." While this test method provides that 220° C. is the testing temperature typically employed in testing polypropylene compositions, the applicant believes that 190° C. is a more suitable temperature since it better approximates the lower processing temperatures that are today employed with many commercial polymers. Thus, the apparent melt viscosities for the polypropylene-containing polyolefin compositions listed herein preferably are determined using the above-referenced test method at a temperature of 190° C. The apparent melt viscosity of the polymer composition can be measured at any suitable apparent shear rate. It is believed that an apparent shear rate of 100 $s^{-1}$ is preferred because it closely approximates the shear that a polymer composition experiences during typical processing conditions. When measuring the apparent melt viscosity of the polyolefin composition, the capillary rheometer preferably is equipped with a 1.00 mm diameter capillary die with a length to diameter ratio of 30:1. Further, the polyolefin composition preferably is allowed to remain in the capillary rheometer for a dwell time of six (6) minutes prior to beginning the test. Lastly, the apparent melt viscosity of the polymer composition preferably is determined after the polymer, 1,3:2,4-bis-O-[(3,4-dichlorophenyl)methylene]-D-glucitol, and any optional components have been melt processed (e.g., passed through an extruder).

Preferably, the polymer composition has an apparent melt viscosity of about 1,200 Pa·s or less at an apparent shear rate of 100 $s^{-1}$. More preferably, the polymer composition has an apparent melt viscosity of about 1,150 Pa·s or less, about 1,100 Pa·s or less, about 1,050 Pa·s or less, about 1,000 Pa·s or less, about 950 Pa·s or less, about 900 Pa·s or less, about 850 Pa·s or less, about 800 Pa·s or less at an apparent shear rate of 100 $s^{-1}$ and a temperature of 190° C. The polymer composition preferably has an apparent melt viscosity of 750 Pa·s or more at an apparent shear rate of 100 $s^{-1}$ and a temperature of 190° C. Thus, in one preferred embodiment, the polymer composition has an apparent melt viscosity of 750 Pa·s to about 1,200 Pa·s at an apparent shear rate of 100 $s^{-1}$ and a temperature of 190° C.

The polymer composition used in the method can have any suitable Melt Flow Rate. The Melt Flow Rate of the polymer composition can be determined by any suitable method. For example, the Melt Flow Rate of the polymer composition can be determined using Procedure B in ASTM Standard D1238-10 entitled "Standard Test Method for Melt Flow Rates of Thermoplastics by Extrusion Plastometer." The Melt Flow Rate of the polymer composition preferably is measured using the aforementioned standard test method. Preferably, the polymer composition has a Melt Flow Rate of about 1 g/10 min or more. More preferably, the polymer composition has a Melt Flow Rate of about 1.5 g/10 min or more, about 2 g/10 min or more, about 2.5 g/10 min or more, about 3 g/10 min or more, or about 3.5 g/10 min or more. The polymer composition preferably has a Melt Flow Rate of 4 g/10 min or less. Thus, in a preferred embodiment, the polymer composition has a Melt Flow Rate of about 1 g/10 min to 4 g/10 min. As in the measurement of the apparent melt viscosity, the Melt Flow Rate of the polymer composition preferably is determined after the polymer, 1,3:2,4-bis-O-[(3,4-dichlorophenyl)methylene]-D-glucitol, and any optional components have been melt processed (e.g., passed through an extruder).

As will be understood by those of ordinary skill in the art, the polymer will contain a population of discrete polymer chains, and those polymer chains will have varying lengths and molar masses. The statistical distribution of the lengths/molar masses of the polymer chains contained in the polymer is generally referred to as the molar mass distribution or molecular weight distribution. The polyolefin polymers used in the compositions described herein can have any suitable molar mass distribution. For example, the polymer can have a molar mass distribution exhibiting a single mode or the molar mass distribution can exhibit a plurality of modes (e.g., bimodal, trimodal, etc.). The breadth of the molar mass distribution of a polymer can be expressed using the polydispersity index. The polydispersity index is calculated by measuring the number average molar mass and the mass average molar mass (i.e., weight average molar mass) of the polymer, and then dividing the mass average molar mass of the polymer by the number average molar mass of the polymer. The result is a dimensionless unit that quantifies the breadth of the molar mass distribution, with higher values indicating greater breadth in the molar mass distribution. The breadth of the molar mass distribution can also be indirectly quantified by measuring and comparing the Melt Flow Rate of the polymer (or a composition containing the polymer) under different conditions to yield a Flow Rate Ratio (FRR). This method is described, for example, in Procedure D of ASTM Standard D1238 entitled "Standard Test Method for Melt Flow Rates of Thermoplastics by Extrusion Plastometer." Preferably, the FRR is calculated using the Melt Flow Rate measured using the 10 kg weight specified in the standard ($MFR_{10}$) and the Melt Flow Rate measured using the 2 kg weight specified in the standard ($MFR_2$). The polymer composition used in the method can have any suitable FRR. Preferably, the polymer composition has a FRR ($MFR_{10}/MFR_2$) of about 18 or less. More preferably, the polymer composition has a FRR ($MFR_{10}/MFR_2$) of about 17.75 or less or about 17.5 or less. Preferably, the polymer composition has a FRR ($MFR_{10}/MFR_2$) of about 17 or more. Thus, in a preferred embodiment, the polymer composition has a FRR ($MFR_{10}/MFR_2$) of about 17 to about 18. As in measuring the apparent melt viscosity and the Melt Flow Rate, the Flow Rate Ratio of the polyolefin composition preferably is determined after the polymer, the 1,3:2,4-bis-O-[(3,4-dichlorophenyl)methylene]-D-glucitol, and any optional components have been melt processed (e.g., passed through an extruder).

The polymer compositions utilized in the method can be prepared by any suitable method. For example, the polymer compositions can be produced by simple mixing (e.g., high shear or high intensity mixing) of the polymer, the 1,3:2,4-bis-O-[(3,4-dichlorophenyl)methylene]-D-glucitol, and any additional optional components. Alternatively, the 1,3:2,4- bis-O-[(3,4-dichlorophenyl)methylene]-D-glucitol and any additional optional components (such as those described above) can be pre-blended to provide an additive composition. This additive composition can then be mixed with the polymer to produce the polymer composition described above. The polymer composition can be provided in any form suitable for use in the method of the invention. For example, the polymer composition can be provided in the form of a powder (e.g., free-flowing powder), flake, pellet, prill, tablet, agglomerate, and the like.

The following examples further illustrate the subject matter described above but, of course, should not be construed as in any way limiting the scope thereof.

EXAMPLE 1

This example demonstrates the method described above and the properties of the article produced by the method. Five ten-kilogram batches of a polypropylene random copolymer composition (Samples 1A-1E) were compounded in accordance with the formulations set forth in Tables 1 and 2 below. The polypropylene random copolymer used in the compositions was a polypropylene random copolymer which had an initial Melt Flow Rate of approximately 2 g/10 min. The 1,3:2,4-bis-O-[(3,4-dichlorophenyl)methylene]-D-glucitol (referred to as "C.A. X" in the tables that follow) and 1,3:2,4-bis-O-[(3,4-dimethylphenyl)methylene]-D-glucitol (referred to as "C.A. Y" in the tables that follow) were synthesized by the applicant. 2,3-Dihydroxypropyl octadecanoate (referred to as "E.A. Z" in the tables that follow) was obtained from a commercial source (that contains 86% 2,3-Dihydroxypropyl octadecanoate).

TABLE 1

General formulation for Samples 1A-1E.

| Component | Amount |
| --- | --- |
| Polypropylene random copolymer flake | 10.0 kg |
| Acid Scavenger (Calcium Stearate) | 8.0 g |
| Primary Antioxidant (Irganox ® 1010) | 10.0 g |
| Secondary Antioxidant (Irgafos ® 168) | 10.0 g |
| C.A. X | As noted in Table 2 below |
| C.A. Y | As noted in Table 2 below |
| E.A. Z | As noted in Table 2 below |

TABLE 2

Amounts of C.A. X, C.A. Y, and E.A. Z used in Samples 1A-1E.

| Sample | Amount of C.A. X (g) | Amount of C.A. Y (g) | Amount of E.A. Z (g) |
| --- | --- | --- | --- |
| 1A | 18.0 | 0 | 0 |
| 1B | 9.0 | 9.0 | 0 |
| 1C | 0 | 18.0 | 0 |
| 1D | 18.0 | 0 | 10.0 |
| 1E | 9.0 | 9.0 | 10.0 |

Each of the polypropylene random copolymer compositions was compounded by blending the components in a Henschel high intensity mixer for approximately 2 minute at a blade speed of approximately 2,100 rpm. The samples were then melt compounded on a MPM single screw compounding extruder with a 40 mm screw diameter and length/diameter ratio of 24:1. The barrel temperature was ramped from about 204° C. to about 232° F. at the die. The extrudate (in the form a strand) for each sample was cooled in a water bath and subsequently pelletized.

Following the preparation sequence as noted above, each of the polypropylene random copolymer compositions was used to produce 500 mL bottles on a Bekum H-121S single-station extrusion blow-molding machine. The blow-molding machine had a 50 mm screw diameter, a length/diameter ratio of 24:1, and a smooth barrel. The barrel temperature was approximately starting at 180° C. and ending at 190° C., with the extrusion head maintained at a temperature of approximately 190° C. The molten polymer parison was extruded at a 200° C. melt temperature into a blow mold that was maintained at mold temperature of approximately 18° C. The final polypropylene bottle weighed approximately 32 grams and measured approximately 32 mils in thickness. The bottles produced were then tested as described below.

The percent haze of the bottle side wall was measured in accordance with ASTM Standard D1103-92 using a BYK-Gardner Haze-Guard Plus. The measured percent haze are reported in Table 3 below.

TABLE 3

Haze values of plaques made from Samples 1A-1E.

| Sample | Haze (%) |
| --- | --- |
| 1A | 17 |
| 1B | 14 |
| 1C | 21 |
| 1D | 15 |
| 1E | 13 |

As can be seen from the data shown in Table 3, when processed at a commercially relevant 200° C. parison temperature, polypropylene random copolymer compositions containing the inventive compound, C.A. X, are as much as 33% lower than polypropylene random copolymer compositions containing the most common commercially available clarifying agent, C.A. Y. In addition, the enhancing effect of E.A. Z is also demonstrated when comparing the haze of Sample 1A and Sample 1 D. Sample 1D is identical in all respect to Sample 1A except that Sample 1D contains E.A. Z enhancing additive which reduced the haze by 12%. Finally, it is noted that C.A. X and E.A. Z act synergistically to improve the optical properties of C. A. Y. Surprisingly, by adding both C.A. X and E.A. Y to formulations containing C. A. Y, the haze of the resulting bottle side wall are 38% lower than the haze of similar bottles clarified with only C. A. Y.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method for molding a polymer composition, the method comprising the steps of:
    (a) providing an apparatus comprising a die and a mold cavity, the mold cavity having an interior surface defining a shape for a molded article;
    (b) providing a polymer composition comprising (i) a thermoplastic polymer and (ii) 1,3:2,4-bis-O-[(3,4-dichlorophenyl)methylene]-D-glucitol;
    (c) heating the polymer composition to a temperature sufficient to melt the polymer composition so that it may be extruded through the die;
    (d) extruding the molten polymer composition through the die to form a parison at a temperature of 200° C. or less;
    (e) capturing the parison in the mold cavity;
    (f) blowing a pressurized fluid into the parison under sufficient pressure to inflate the parison so that it conforms to the interior surface of the mold cavity and produces a molded article;
    (g) allowing the molded article to cool to a temperature at which the polymer composition at least partially solidifies so that the molded article retains its shape; and
    (h) removing the molded article from the mold cavity.

2. The method of claim 1, wherein the 1,3:2,4-bis-O-[(3,4-dichlorophenyl)methylene]-D-glucitol is present in the polymer composition in an amount of about 250 ppm to about 3,000 ppm.

3. The method of claim 2, wherein the 1,3:2,4-bis-O-[(3,4-dichlorophenyl)methylene]-D-glucitol is present in the polymer composition in an amount of about 500 ppm to about 2,000 ppm.

4. The method of claim 1, wherein the polymer composition further comprises 1,3:2,4-bis-O-[(3,4-dimethylphenyl)methylene]-D-glucitol.

5. The method of claim 4, wherein the 1,3:2,4-bis-O-[(3,4-dichlorophenyl)methylene]-D-glucitol and 1,3:2,4-bis-O-[(3,4-dimethylphenyl)methylene]-D-glucitol are present in the polymer composition in a ratio of about 9:1 to about 1:9.

6. The method of claim 4, wherein the total amount of 1,3:2,4-bis-O-[(3,4-dichlorophenyl)methylene]-D-glucitol and 1,3:2,4-bis-O-[(3,4-dimethylphenyl)methylene]-D-glucitol present in the polymer composition is about 250 ppm to about 3,000 ppm.

7. The method of claim 6, wherein the total amount of 1,3:2,4-bis-O-[(3,4-dichlorophenyl)methylene]-D-glucitol and 1,3:2,4-bis-O-[(3,4-dimethylphenyl)methylene]-D-glucitol present in the polymer composition is about 500 ppm to about 2,000 ppm.

* * * * *